Figure 1:
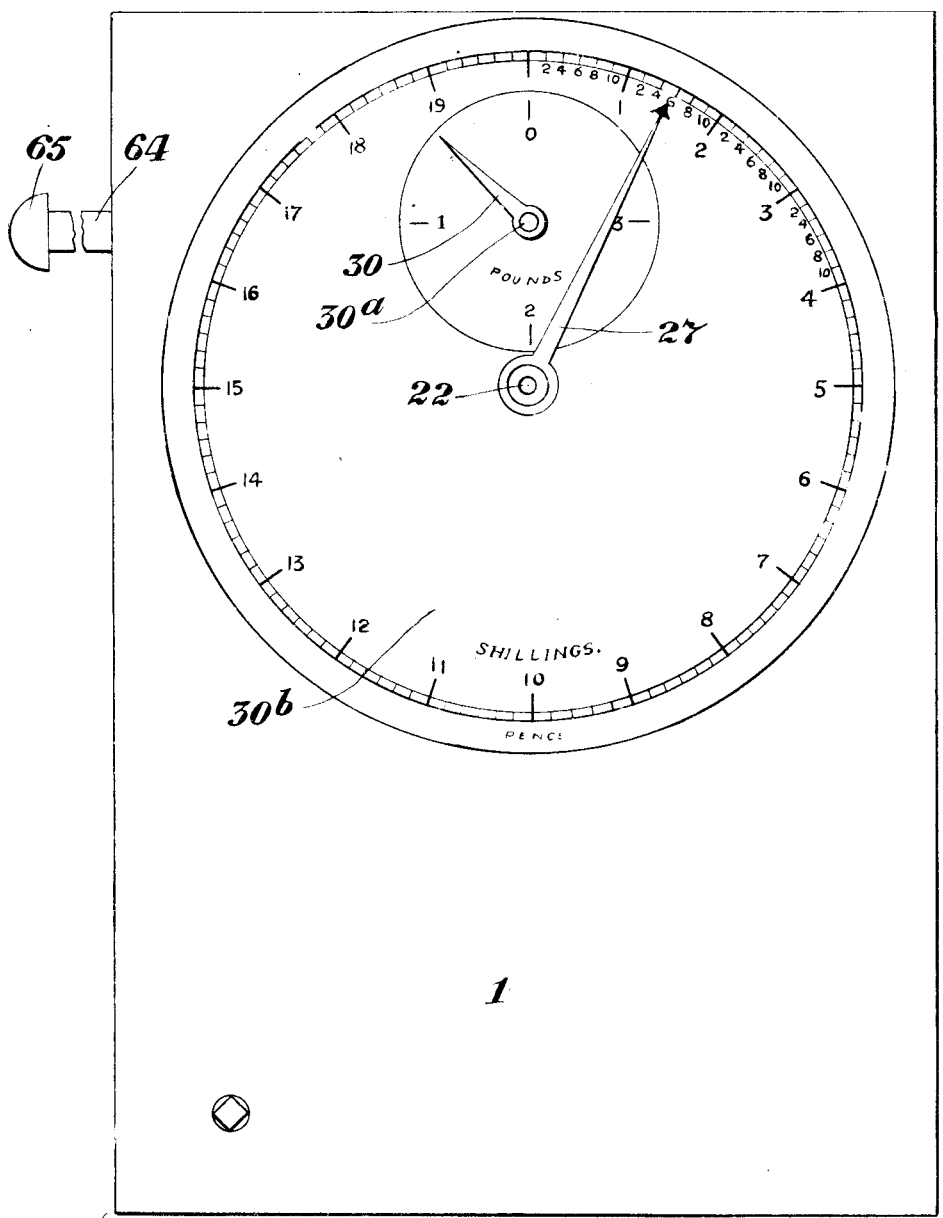

C. ROBINSON.
ELECTRICALLY ACTUATED TAXIMETER FOR CABS AND LIKE VEHICLES.
APPLICATION FILED NOV. 30, 1912.

1,171,889.

Patented Feb. 15, 1916.
5 SHEETS—SHEET 1.

C. ROBINSON
ELECTRICALLY ACTUATED TAXIMETER FOR CABS AND LIKE VEHICLES.
APPLICATION FILED NOV. 30, 1912.

1,171,889.

Patented Feb. 15, 1916.

8 SHEETS—SHEET 4.

Witnesses:
P. F. Nagle.
H. G. Dieterich

Inventor
Charles Robinson
By Wiederscheim Fairbanks
Attorneys.

C. ROBINSON.
ELECTRICALLY ACTUATED TAXIMETER FOR CABS AND LIKE VEHICLES.
APPLICATION FILED NOV. 30, 1912.

1,171,889.

Patented Feb. 15, 1916.
8 SHEETS—SHEET 6.

Witnesses:
P. F. Nagle.
H. G. Dieterich

Inventor
Charles Robinson,
By Wiedersheim Fairbanks
Attorneys

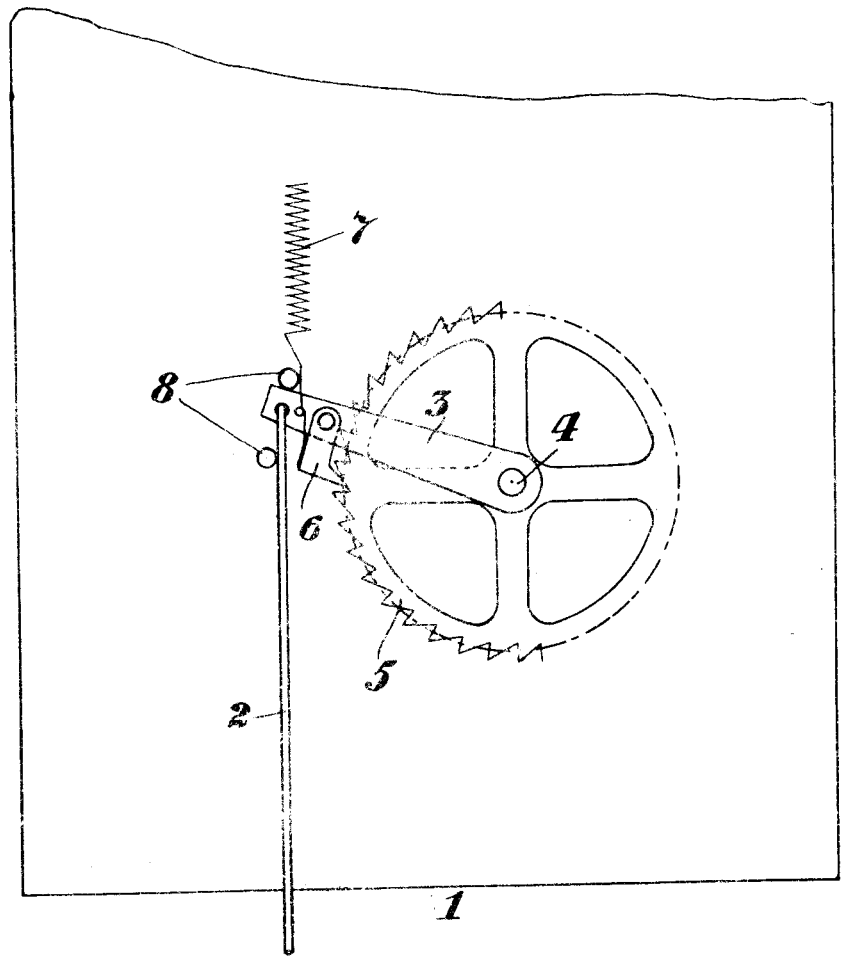

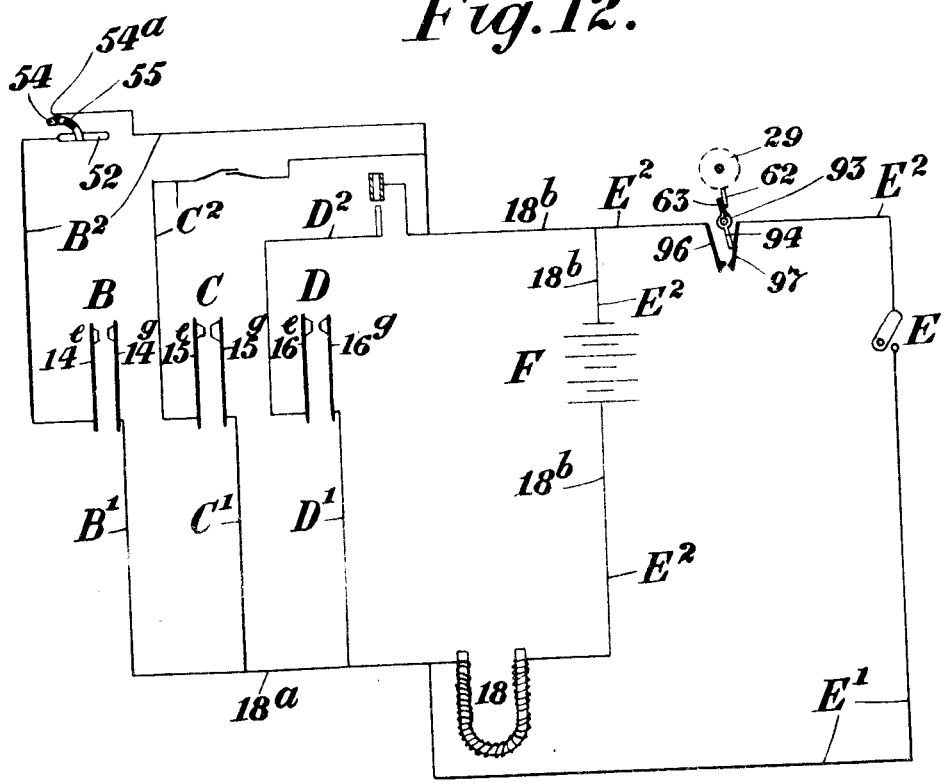

UNITED STATES PATENT OFFICE.

CHARLES ROBINSON, OF DUNOON, SCOTLAND.

ELECTRICALLY-ACTUATED TAXIMETER FOR CABS AND LIKE VEHICLES.

1,171,889.

Specification of Letters Patent.   Patented Feb. 15, 1916.

Application filed November 30, 1912.   Serial No. 734,286.

*To all whom it may concern:*

Be it known that I, CHARLES ROBINSON, a subject of the King of Great Britain, residing at Dunoon, county of Argyle, Scotland, have invented certain new and useful Improvements in and Relating to Electrically-Actuated Taximeters for Cabs and like Vehicles, of which the following is a specification.

This invention relates to electrically actuated taximeters for cabs and like vehicles of the type in which the amount chargeable to each "Fare" is registered and visibly displayed on a dial (or dials) and is at the same time registered within the apparatus, said dial (or dials) being capable of being re-set at zero upon the discharge of each "fare."

Under the present invention the taximeter, which is actuated by electrical means, automatically registers and visibly displays the total amount chargeable to each "fare", including charges for excess luggage and (or) extra passengers carried, and also totalizes and registers the whole earnings of the vehicle (over any suitable period of time) in a manner beyond the driver's control. Means are also preferably provided whereby the meter can register the amount chargeable for time and distance combined, and for extra passengers or excess luggage, or both, at a predetermined rate or rates per unit distance run.

Motion is communicated from the road wheels of the vehicle, by suitable means, to a spindle carrying a number of wipers, cams or the like, said wipers causing oscillating blocks, attached to suitable beam levers, to close momentarily members of electric spring contacts thereby closing circuits from switches in suitable parts of the vehicle to an electro-magnet. The aforesaid wipers are so arranged that no two circuits are closed simultaneously. The said electro-magnet operates, at each passage of current therethrough, an armature which, through suitable connections, operates a pair of levers, loosely mounted upon a spindle which carries fare and totalizer wheels and by means of driving pawls thereon actuates these wheels so as to cause the fare payable by each passenger and the total earnings of the vehicle to be registered.

In order that the invention may be clearly understood I have hereunto appended explanatory drawings which show, by way of illustration or example, a method of carrying out my invention.

Figure 2:
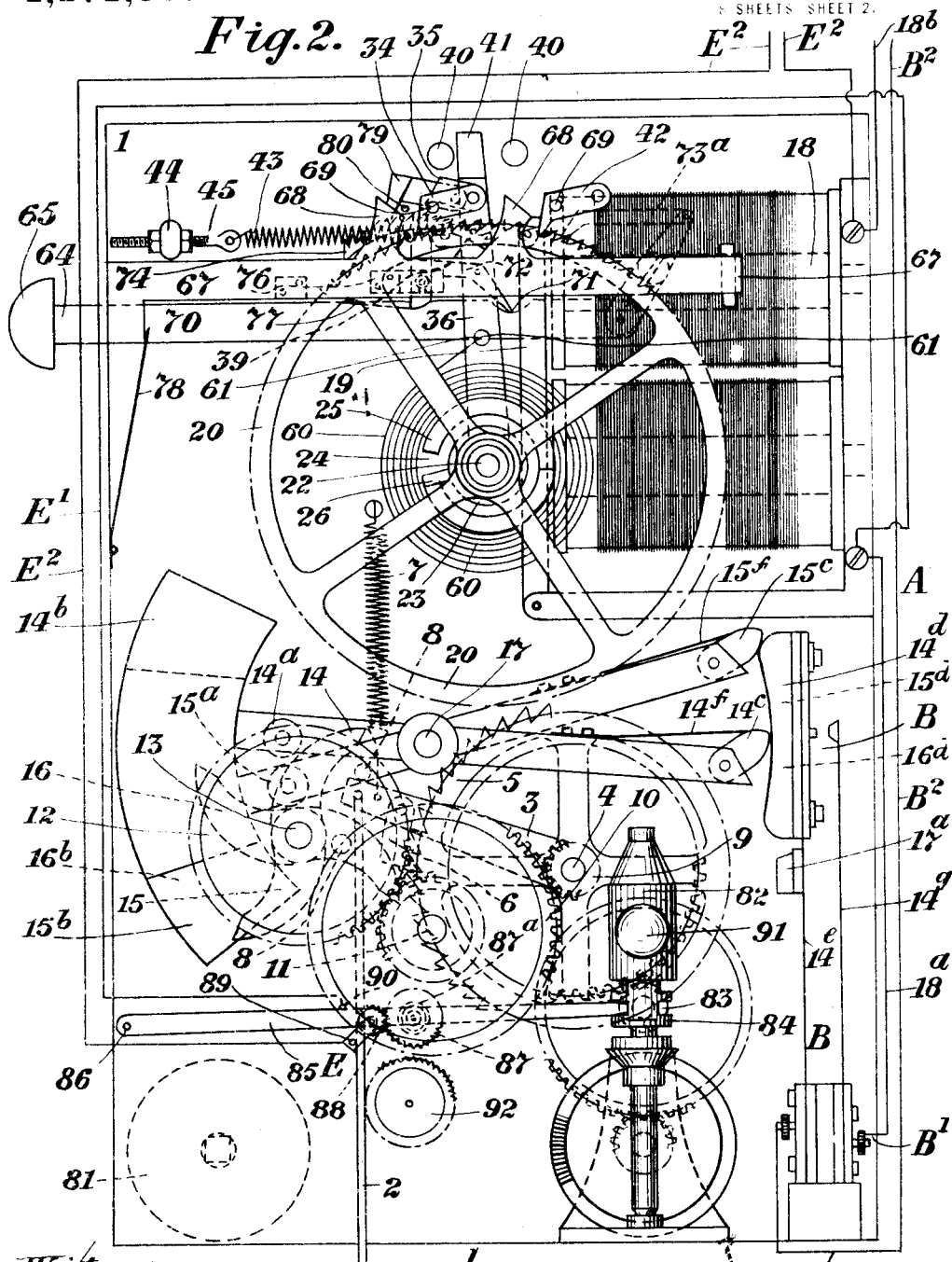
Figure 3:
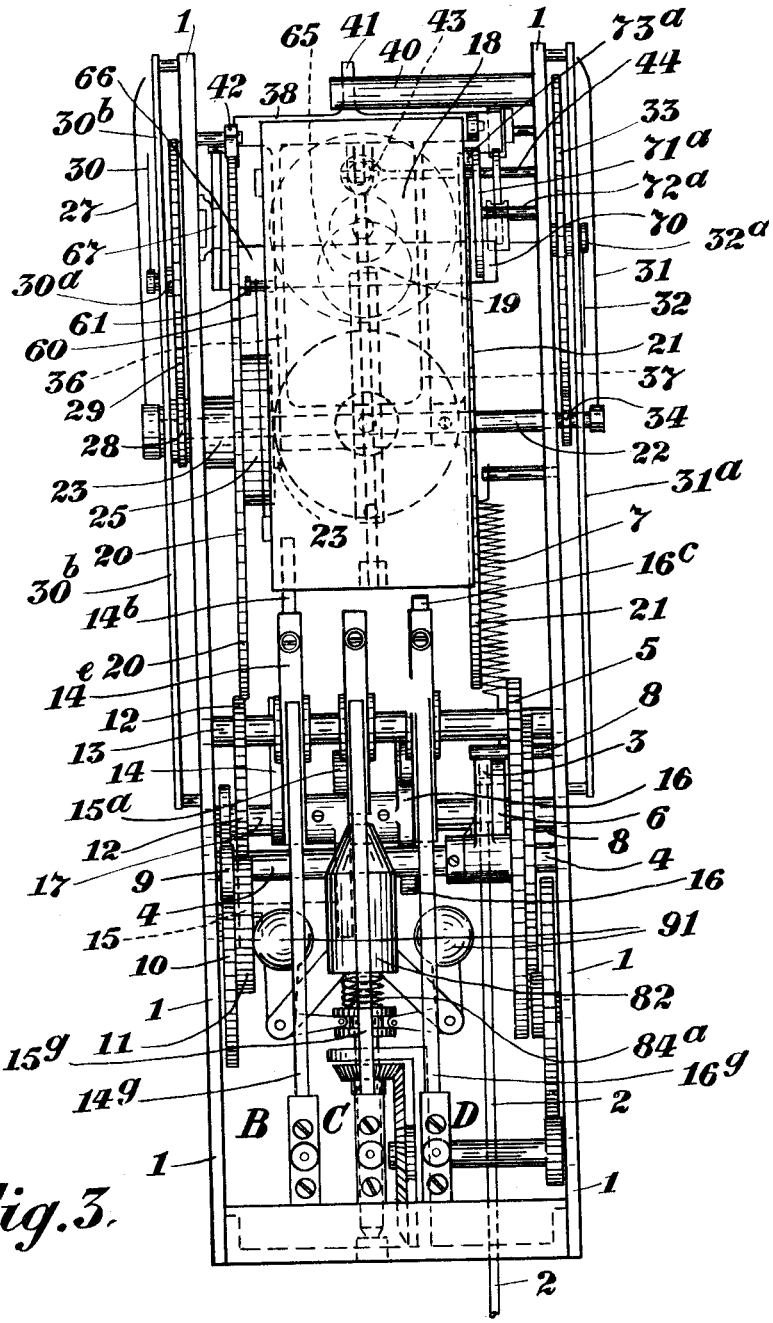
Figure 4:
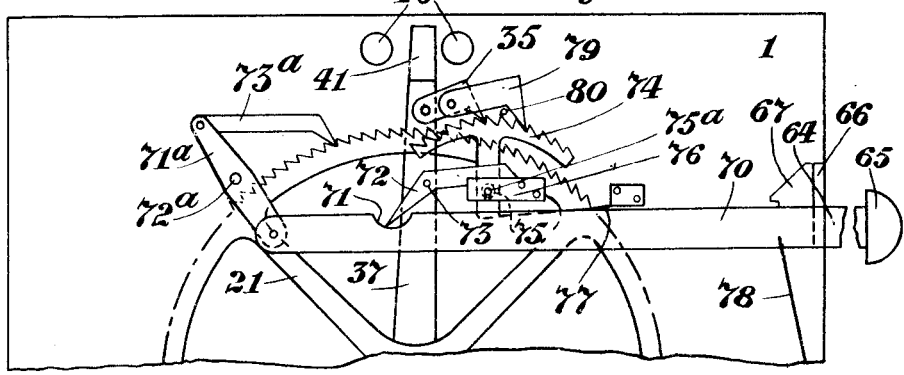
Figure 5:
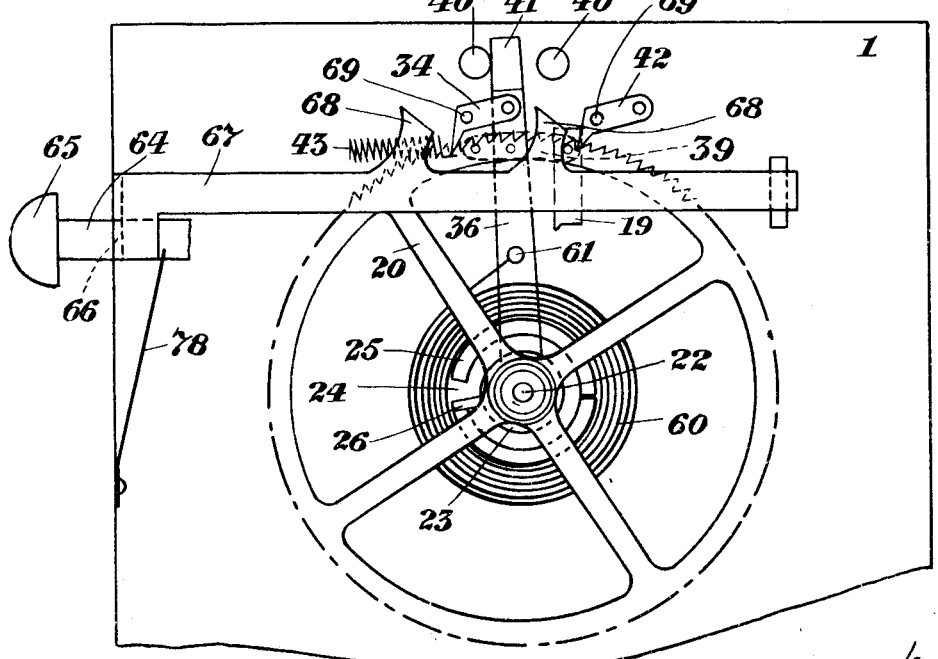
Figure 6:
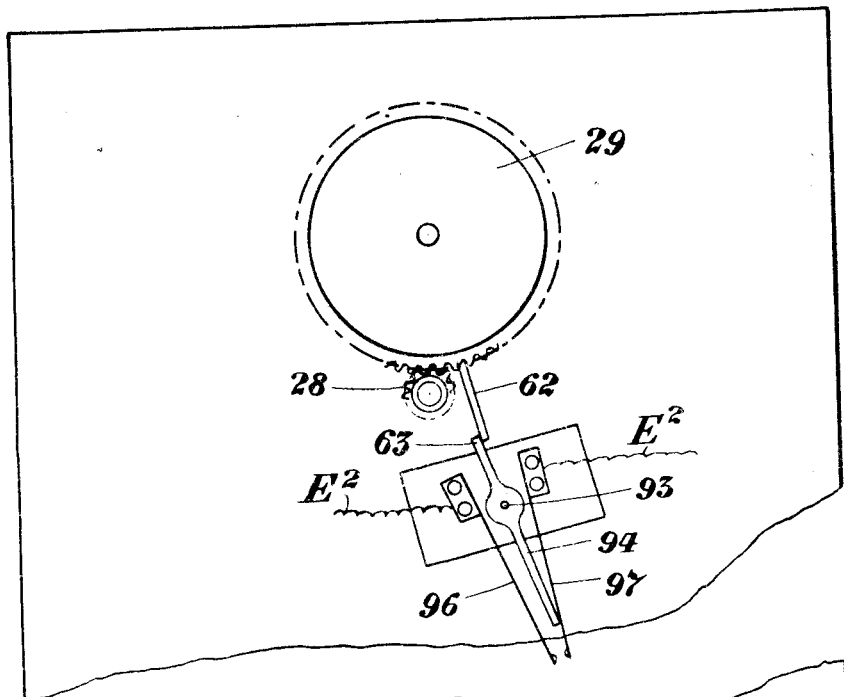
Figure 7:
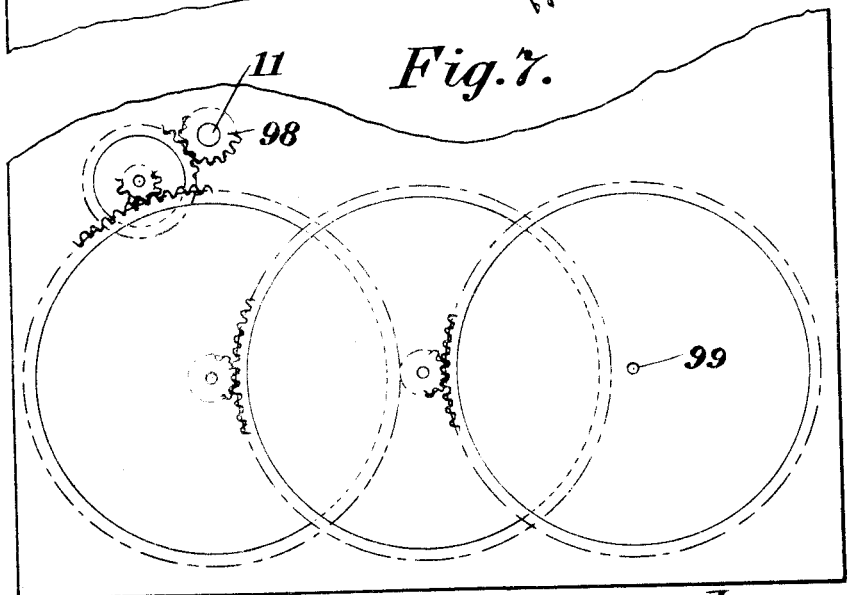
Figure 8:
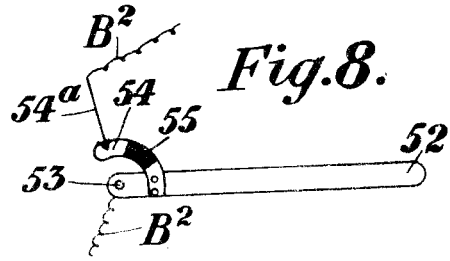
Figure 9:
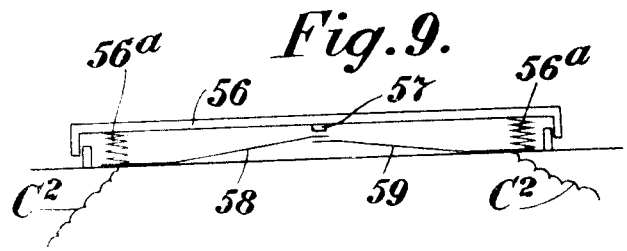
Figure 10:
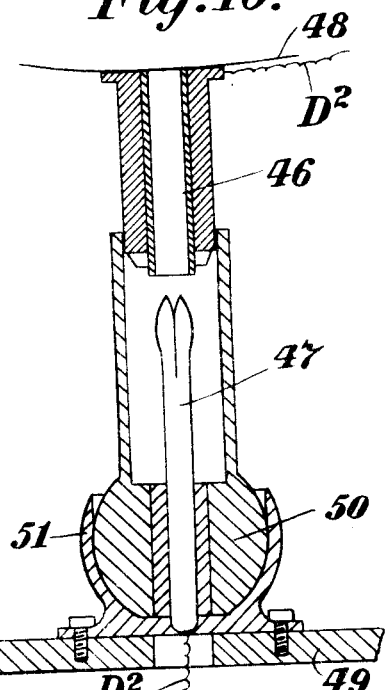

Figure 1 is a front elevation of the taximeter casing showing the fare indicator. Fig. 2 is a front elevation of the apparatus with the casing removed. Fig. 3 is a side view of the apparatus, looking at side A, Fig. 2, with sides and top of casing removed. Fig. 4 is a back view of the arrangement for operating the totalizer wheel, all other gear being removed for the sake of clearness. Fig. 5 is a front view of the arrangement for operating the fare wheel, all other gear being removed. Fig. 6 is a detail view of the arrangement for controlling the time circuit. Fig. 7 is a detail view of a train of gear wheels which may be embodied in the apparatus for indicating and registering the mileage run by the vehicle. Fig. 8 is a view of a switch attachment suitable for controlling an auxiliary circuit through a pivoted seat. Fig. 9 is a view of a switch suitable for closing an auxiliary circuit when a predetermined weight of luggage is placed upon the luggage carrier. Fig. 10 is a sectional elevation of a switch suitable for controlling the main or passenger circuit of the meter. Fig. 11 is a detail view showing the connecting wire 2, lever 3, spring pawl 6 and ratchet wheel 5 and accessories for conveying the motion of the road wheel to the mechanism for actuating the indicator pointers. Fig. 12 is a diagram showing the electrical connections of the apparatus.

In carrying the invention into effect or practice the mechanism, which is contained in a suitable casing 1, may be constructed and arranged as follows:—The meter may be connected to the driving or road wheels of the vehicle by means of an eccentric or cam on the axle, or by any suitable speed reducing mechanism or like means, giving motion at each revolution of the wheel and axle, either forward or backward, to a wire, lever or the like 2 connected to one end of a lever 3 (see Figs. 1 and 11) which is fitted to oscillate loosely on a spindle 4 carrying a ratchet wheel 5 fast thereon, and, by means of a spring pawl 6 engaging with the ratchet of a spring pawl 6 engaging with the ratchet teeth, to turn said wheel 5 one or more teeth as may be arranged for every revolution of the road wheel. A spring 7 is connected to the end of the lever 3 and to the casing 1 to return the lever after every movement, and fixed pins 8, one on each side of the said lever regulate the extent of its travel. The spindle 4 carries fast thereon a pinion 9 engaging with the spur wheel 10 which has concentric therewith and rigidly attached thereto, a pinion 11 engaging the spur wheel 12 rigidly attached to the spindle 13. The aforedescribed mechanism is constructed and arranged to rotate the spindle 13 twice or other suitable number of times as may be arranged, for each mile of distance run by the vehicle.

In the following paragraphs it is assumed merely by way of illustration or example, that the minimum tariff is 8d. (for one mile) and the succeeding charges 2d. for each quarter mile and charges for excess baggage and extra passengers in due proportion. It is to be clearly understood however, that this is merely an example and that the mechanism may be so constructed and arranged as to cause any charge, in accordance with the practice of the district in which used, to be registered.

A number of wipers, (preferably three) 14, 15 and 16, two of which, 14 and 15, are single wipers adapted to engage the part of the mechanism coöperating therewith once in each revolution while 16 is a double wiper adapted to engage its coöperating part twice in each revolution, are secured to the spindle 13 and are so arranged that, as the spindle revolves, they engage, respectively, rollers 14ᵃ, 15ᵃ, and 16ᵃ attached, respectively, to weighted beam levers 14ᵇ, 15ᵇ and 16ᵇ each of which beam levers is pivotally secured on a pin 17, so that the weighted ends of the levers may be raised to the full lift of the wipers. The other ends of these beam levers are fitted with spring controlled oscillating blocks 14ᶜ, 15ᶜ and 16ᶜ respectively, which are pivoted thereto and are capable of being turned in one direction only, so that, as the weighted ends of the beam levers are raised by the aforesaid wipers, the blocks 14ᶜ, 15ᶜ and 16ᶜ are caused to turn back by the resistance offered by insulated blocks 14ᵈ, 15ᵈ and 15ᵈ attached to members 14ᵉ, 15ᵉ and 16ᵉ respectively of spring electric contacts B, C, and D, said members being prevented from vibrating by a bar 17ᵃ extending laterally across the casing 1. When the beam levers have moved clear of the said insulated blocks, the oscillating blocks 14ᶜ, 15ᶜ, and 16ᶜ return to their original positions under the action of springs 14ᶠ, 15ᶠ and 16ᶠ respectively and, as the extremities of the wipers 14, 15, and 16 move from under the rollers 14ᵃ, 15ᵃ, and 16ᵃ respectively and the weighted ends of the beam levers drop, the oscillating blocks 14ᶜ, 15ᶜ and 16ᶜ move upward and momentarily press the spring members 14ᵉ, 15ᵉ and 16ᵉ respectively against other spring members 14ᵍ, 15ᵍ and 16ᵍ respectively of the spring electric contacts B, C and D thus closing circuits therethrough. The aforedescribed wipers 14 and 15 operate their respective levers once in each revolution of the spindle 13 and thus make one contact per revolution and the wiper 16 operates its lever twice in each revolution thus making two contacts for each revolution of the spindle 13. The contacts B, C, and D are, by means of branch wires Bˣ, Bʸ, Cˣ, Cʸ, and Dˣ, Dʸ, and cables or the like 18ᵃ and 18ᵇ (see Fig. 12) in electrical connection with an electro-magnet 18 which, through its armature 19, is adapted to actuate the levers and pawls of the registering mechanism hereinafter described.

Two toothed wheels 20 and 21 (see Figs. 3, 4 and 5) are mounted on a spindle 22 and are hereinafter referred to as the "fare" wheel (20) and the "totalizer" wheel (21). The fare wheel 20 is mounted loosely upon a sleeve 23 which is also mounted loosely upon the spindle 22, but motion is communicated from the fare wheel 20 to the sleeve 23 by means of a gap 24 in a ring or boss 25, which is rigidly attached to the wheel concentrically therewith, the sides of said gap being adapted to engage with a pin 26 on the sleeve 23, and permitting a limited amount of independent movement. The sleeve 23 when revolved by the fare wheel 20 gives motion to the shillings and pence indicator pointer 27 which is directly connected to the said sleeve, and, through the pinion 28 and spur wheel 29, actuates the pounds indicator pointer 30, said pointer being rigidly attached to the arbor 30ᵃ of the spur wheel 29.

30ᵇ is a graduated dial over which the pointers 27 and 30 move.

The totalizer wheel 21 is rigidly secured to the spindle 22, to which is attached a shillings and pence indicator pointer 31, and a pounds indicator pointer 32 is attached to the arbor 32ᵃ of a spur wheel 33 which engages a pinion 34, fast upon the spindle 22. The pointers 31 and 32 move over a suitably graduated dial 31ᵃ similar to but of greater capacity than the dial 30ᵇ and which constitutes the proprietor's or totalizer indicator. The totalizer wheel may be so geared to the totalized pointers as to cause the same to indicate the total earnings within any period such as a day or week.

The fare and totalizer wheels are operated through the agency of the armature 19 of the electro-magnet 18 by means of actuating arms 35 and 36 respectively (Figs. 4 and 5) carried by the arms or levers 36 and 37 respectively which are connected together at one end by a bridge piece 38 and to the armature 19 by a connecting link 39. The arms or levers 36 and 37 are pivoted loosely on the spindle 22 and pins 40 fixed to the casing 1 limit their travel by limiting the travel of a projecting piece 41 on the bridge piece 38. A check pawl 42 acts upon the fare wheel 20 to prevent backward movement thereof. The forward movement of the wheels 20 and 21 is effected by a spring 43, which is attached to a pin 44 in the casing 1 and to the connecting link 39, and pulls same forward until the projection 41 upon the said bridge piece 38 comes into contact with one of the stop pins 40 after the armature 19 has drawn the arms or levers 36 and 37 backward and caused the pawls thereon to ride backward over a predetermined number (one or more) of the teeth of the wheels 20 and 21. The pull exerted by the spring 43 may be regulated by attaching same to the pin 44 by a screw or the like 45. Operated in this manner, both wheels are revolved simultaneously, and, through the respective train of wheels, indicate on the fare dial the fares payable by each passenger and on the totalizer dial the total earnings of the vehicle.

The entrance of a passenger to the vehicle closes a circuit through a switch (such as shown in Fig. 10) fixed in any suitable manner, under the floor or other part of the cab body, so that the passenger's weight (whether he be seated or not) necessarily causes a socket member 46 to sink into contact with a plug or pin member 47 and so close the switch. Any movement of the portion of the vehicle, attached to an upper part 48 of the switch, lateral or longitudinal to the lower part 49 is taken up by a ball member 50 engaging in a socket member 51. This main, or passenger, switch, located in the circuit D² (Fig. 12), controls the current from the accumulators or other source of electricity F located on the vehicle to the spring contact D operated by the wiper 16 which causes the said contact D to close the circuit to the electro-magnet 18 twice for each revolution of the spindle, 13. As has been hereinbefore stated, the spindle 13 revolves twice, or other suitable number of times, for each mile traveled by the vehicle, thus the electro-magnet 18 is energized and the wheels 20 and 21 moved four times or other suitable number of times as may be arranged, for each mile traveled. Each movement of the wheels 20 and 21 can be made to register a certain increment of fare (say 2d.) on the fare and totalizer dials, 30ᵇ and 31ᵃ respectively, thus when the main or passenger switch is closed the fare is being registered on both dials at the rate of 8d. per mile.

52 (Fig. 8) represents the front seat, beside the driver, or any other seat on the vehicle that may be used for an extra passenger, and which may be pivoted at 53 and held up, when not in use, by springs or balance weights or the like. Attached to the seat is a metal quadrant 54 partly covered with an insulating material at 55, said quadrant forming one member of a switch. The arrangement is such that when the passenger lowers the seat a spring member 54ᵃ contacts with the bare part of the quadrant 54 and thus closes the switch and, when the passenger alights, the seat is returned to its original position by springs or the like and the spring member contacts with the insulated part 55 thus opening the switch. This auxiliary, or extra passenger switch, located in the circuit B² (Fig. 12), controls the current to the spring contact B, operated by the wiper 14 which causes the said contact B to close the circuit to the electro-magnet once for each revolution of the spindle 13. Thus the electro-magnet is energized twice for each mile traveled by the vehicle, and, under same convention as described for the main or passenger circuit, 4d. is indicated on the fare and totalizer dials.

A switch, such as shown in Fig. 9, may be placed under the luggage platform 56 which may be mounted upon springs 56ᵃ so that, when more than a predetermined weight of luggage is placed upon the platform, the said platform sinks and a projection 57 depending therefrom causes the spring members 58 and 59 to contact with one another thus closing the switch. This switch, located in the circuit C² (Fig. 12) controls the current to the spring contact C, operated by the wiper 15, which, as hereinbefore described with reference to the contact B, causes 4d. to be indicated upon the fare and totalizer dials for each mile traveled by the vehicle.

A coil spring 60 is attached by one end to the fare wheel 20 or to the ring or boss 25 affixed thereon and by the other to a pin 61 attached to the arm 36 and is wound up as the wheel 20 is revolved and brings back the wheel and its train of indicating wheels to the starting point (minimum fare indication) when the fare wheel 20 is released from its pawls. The starting point is reached when a pin or projecting tooth 62 (Fig. 6) on the gear wheel 29 of the fare indicating mechanism comes into contact with a stopper or the like 63. This return to the starting point is effected at the conclusion of each hire by means of a bar 64 projecting from the casing 1 and having a knob 65 on its outer end. Attached to the inner end of the bar 64 by means of a cross bar 66, is a bar 67 (Fig. 5) having two projections 68 with inclined faces formed thereon which, when the bar is pushed inward come into contact with projecting pins 69 on the actuating and check pawls of the fare wheel and lift them out of contact with the teeth of the wheel which is then free to revolve and to return the indicating pointers to the starting point under the action of the coil spring 60. At the same time a bar 70 (Fig. 4), attached to the bar 64 by means of the cross bar 66, moves a lever 71ᵃ having one end pivotally attached thereto and fulcrumed on a pin 72ᵃ attached to the back of the casing 1 (removed) so as to cause a pawl 73ᵃ pivoted to the other end of the lever 71ᵃ to rotate the totalizer wheel 21 and add the minimum fare to the fare already shown on the totalizer, or proprietor's dial. The gap 24, (Figs. 2 and 5) which is provided in the ring 25 attached to the fare wheel 20 and engaging with the pin 26 on the sleeve 23 is of such width as to allow the minimum fare to be left on the fare indicator when the fare wheel 20 is returned to the starting point by the coil spring 60, and does not move the pointers thereon until the fare wheel 20 has been rotated a distance corresponding to the minimum fare.

To prevent the totalizer wheel 21 being revolved until the vehicle has run the distance corresponding to the minimum fare the bar 70 has a curved notch or recess 71 formed therein and, engaging with this notch, there is a bent lever 72, fulcrumed on a pin 73 secured to the back of the casing 1 (removed) and having one end thereof forked and embracing therein the shank of a ratchet sector 74 and bearing upon collars 75 formed on pins 75ᵃ thereon, so that as the bar 70 is moved inward the notch 71 causes the bent lever 72 to bear upon the collars 75 and force the sector 74 downward, in a slotted bracket 76, against the action of a spring 77, said bracket 76 and spring 77 being attached to the back of the casing 1 (removed). The end of the shank of the sector 74 is so formed as to be capable of fitting into the curved end of the spring 77 so that, as the sector 74 moves downward and the teeth thereof are released from a retaining pawl 79, the end of the shank of the sector is caused to move into the said curved end of the spring which is so arranged that when the shank of the sector 74 engages therewith, and when the sector moves up again under pressure from the said spring, it raises the actuating pawl 35 out of engagement with the totalizer wheel 21 and retains it in engagement with the teeth of the sector until the electromagnet 18 has caused the arm 37 to make the number of oscillations corresponding to the minimum fare whereupon the pawl 35, having moved the sector 74 out of position to operate therewith, reëngages the teeth of the wheel 21. In order to prevent the sector 74 from moving back under the action of the spring 77 the retaining pawl 79 is pivoted to the back of the casing 1 (removed in Fig. 4) and to prevent said pawl from dropping on to the teeth of the wheel 21 when the sector 74 is moved downward a pin 80 is attached to the back of the casing and is so situated as to support the pawl 79 clear of all other mechanism when the quadrant is lowered.

In order to register the charges for time, as when the car is running and making stoppages for shopping or other purposes, a timepiece or like mechanism 81 is carried in any convenient place and is so arranged that, when the car stops, a time circuit is closed and the electro-magnet energized once in every predetermined interval of time. This may be carried out by arranging, in any suitable position, a spring-controlled governor 82 so geared with a suitable moving part of the vehicle that its speed varies with the speed of the vehicle, said governor having fitted thereto a sliding sleeve 84 adapted to be raised when the governor revolves at a speed sufficient to extend its balls or weights 91 and lowered when the speed of the governor is not sufficient to extend said balls or weights. Engaging a groove 83 in the sliding sleeve 84 is one end of a bar or rod 85 pivotally secured to the casing 1 at the other end by a pin 86. Mounted at an intermediate part of the bar 85 is a spur wheel 87 engaging a pinion 88 to which is attached a radial arm 89 forming one member of a switch E, while a stud 90 insulated from, and attached to, the casing 1, (and which is so arranged that the arm 89 contacts therewith at each revolution of the same, when the wheel 87 is in engagement with the wheel 92 of the clockwork mechanism but not otherwise) forms the other member of the switch. This switch is electrically connected to the electro-magnet 18 by the wires E¹ and E² (see also Fig. 12). The arrangement is such that, when the speed of the vehicle falls below that necessary to give the balls 91 of the governor sufficient centrifugal force to keep them extended, the sleeve 84 drops and lowers the arm 85 thus allowing the spur wheel 87 to engage a spur wheel 92 of the clock-work mechanism, thereby rotating the arm 89 and causing it to contact with the stud 90 at each revolution the wheels being so geared that contact is made and 2d. registered on both indicators once every 2½ minutes, or as may be arranged. A spring 87ᵃ is, or may be, provided on the wheel 87 to return the arm 89 to its original position when the governor raises the wheel 87 out of engagement with the clock-work mechanism, or the free end of the radial arm 89 may be weighted so as to cause the said arm to fall by gravity into the same position every time that the governor raises the wheel 87 out of engagement with the clockwork mechanism. An adjustable spring 84ᵃ on the governor allows same to be regulated to operate at any predetermined speed. By this arrangement should the car be driven at less than a certain speed the indicator is actuated by both time and distance circuits. The governor 82 and timepiece 81 may be situated in any convenient part of the mechanism, and not necessarily in the meter casing as shown, and electrically connected to the meter.

The radially projecting pin 62 (Fig. 6), which is provided on the gear wheel 29 out of the fare indicating mechanism and acts as a stop when the fare indicator has returned to the starting point (minimum fare indication), may also be used as a means of breaking the contact of the time circuit. The stopper pin or the like 63 which stops the rotation of the bar or tooth 62 when the starting point is reached may take the form of a lever (Fig. 6) pivoted to the casing at 93 and having a projecting arm 94 arranged between two spring contacts 96 and 97 arranged in the wire $E^2$ (Fig. 12) and controlling the circuit of the switch E. These contacts are normally held closed but when the pin 62 strikes the stopper 63 the arm 94 presses against the contact 97 and breaks the connection between it and the contact 96. Thus it will be seen that when the fare indicator stands at the starting point no time charge will be recorded but when a short distance has been run with a passenger and the indicator has moved away from its starting position, the contacts 96 and 97 close the time circuit and when the car stops waiting time will be charged. A train of gear wheels (Fig. 7) may be driven from a pinion 98 mounted upon the spindle 11 for the purpose of registering the distance run by the vehicle, a pointer working over a distance dial being attached to the spindle 99.

In operation, when a passenger (or passengers) enters the vehicle his weight closes the main switch (Fig. 10) thus completing the circuit from the accumulators F, or other source of current, to the spring contact D which, as hereinbefore described, causes 8d. per mile to be registered on both dials. Should there be a passenger unable to be accommodated within the car he uses the hinged seat 52 thus closing the auxiliary switch (Fig. 8) and completing the circuit from the accumulators to the spring contact B which, as hereinbefore described, causes an extra 4d. per mile to be recorded on the dials. Should a passenger have more than a predetermined weight of luggage its weight upon the luggage carrier causes same to sink and close the switch (Fig. 9) thus completing the circuit from the accumulators to the spring contact A which causes an additional 4d. per mile to be recorded. Should the passenger alight and still retain the car in engagement the governor 91 stops and lowers the arm 85 thus causing the wheel 87 to engage with the clockwork mechanism which operates the switch E which, as hereinbefore described, causes 2d. to be registered on the dials for each 2½ minutes that the car waits. When the passenger dismisses the car the driver presses in the knob 65 which, through the medium of the aforedescribed mechanism, returns the fare indicator to the starting point (minimum fare) and adds the minimum fare to the fare already recorded on the totalizer or proprietor's indicator.

With this apparatus the driver's only action is to push in the knob 65 upon the passenger's leaving the car. It would not be to his advantage to omit doing this because, though the fare indicator would not then indicate properly, the totalizer indicator would go on just the same.

Having now fully described my invention, what I claim and desire to secure by Letters Patent is:—

1. An indicating device for cabs and like vehicles having, in combination, an indicating dial, a totalizing dial, a pointer adapted to move over said indicating dial, a pointer adapted to move over said totalizing dial, electrically operable means for synchronously moving said pointers over said dials and means whereby the minimum fare chargeable may be added to the amount already registered on the totalizing dial.

2. An indicating device for cabs and like vehicles having, in combination, an indicating dial, a totalizing dial, a pointer adapted to move over said indicating dial, a pointer adapted to move over said totalizing dial, electrically operable means for synchronously moving said pointers over said dials, means whereby the indicating dial may be returned to the minimum fare indication and means whereby the minimum fare chargeable may be added to the amount already registered on the totalizing dial.

3. An indicating device for cabs and like vehicles having, in combination, an indicating dial, a totalizing dial, a pointer adapted to move over said indicating dial, a pointer adapted to move over said totalizing dial, electrically operable means for synchronously moving said pointers over said dials, means whereby the indicating dial may be returned to the minimum fare indication and means whereby the minimum fare chargeable may be added to the amount already registered on the totalizing dial synchronously with the return of the indicating dial to the minimum fare indication.

4. An indicating device for cabs and like vehicles having, in combination, an indicating dial, a pointer adapted to move over said dial and normally indicating the minimum fare payable, electrically operable means for moving said pointer over said dial so as to indicate the amount payable to each "fare," means whereby the indicating means are rendered operative upon the occupation of the vehicle by a passenger, and means for preventing any movement of the pointer until a distance corresponding to the minimum fare has been run.

5. An indicating device for cabs and like vehicles having, in combination, an indicating dial, a pointer adapted to move over said dial and normally indicating the minimum fare payable, electrically operable means for moving said pointer over said dial so as to indicate the amount payable to each "fare," means whereby the indicating means are rendered operative upon the occupation of the vehicle by a passenger and means for preventing any movement of the pointer until a time corresponding to the minimum fare has passed.

6. An indicating device for cabs and like vehicles having an indicating dial, a pointer adapted to move over said dial and indicate the fare payable by each passenger, said pointer normally indicating the minimum fare payable, a totalizing dial, a second pointer adapted to move over said totalizing dial and indicate the total earnings of the vehicle, means whereby the indicating means are rendered operative upon the occupation of the vehicle by a passenger and means for preventing any movement of the pointers until the distance corresponding to the minimum fare has been run.

7. An indicating device for cabs and like vehicles having an indicating dial, a pointer adapted to move over said dial and indicate the fare payable by each passenger, said pointer normally indicating the minimum fare payable, a totalizing dial, a second pointer adapted to move over said totalizing dial and indicate the total earnings of the vehicle, means whereby the indicating means are set in operation upon the occupation of the vehicle by a passenger and means for preventing any movement of the pointers until the time corresponding to the minimum fare has been run.

8. An indicating device for cabs and like vehicles having an indicating dial, a pointer adapted to move over said dial and indicate the fares payable, said pointer normally indicating the minimum fare payable, a totalizing dial, a second pointer adapted to move over said totalizing dial and indicate the total earnings of the vehicle, electrically operable means whereby the indicating means are set in operation upon the occupation of the vehicle by excess weight of luggage and means for preventing any movement of the pointer until the distance corresponding to the minimum fare has been run.

9. An indicating device for cabs and like vehicles having, in combination, an indicating dial, a pointer adapted to move over said dial, a totalizing dial, a second pointer adapted to move over said totalizing dial, electrical means for moving said pointers and switch means whereby said pointer moving means is set in operation upon the occupation of the vehicle by excess weight of luggage.

In testimony whereof I affix my signature in presence of two witnesses.

CHARLES ROBINSON.

Witnesses:
   WALTER GEORGE PEARSON,
   MARGARET FINDLAY YOUNG.